(12) United States Patent
Je-Chang et al.

(10) Patent No.: US 6,263,026 B1
(45) Date of Patent: Jul. 17, 2001

(54) SIGNAL COMPRESSING SYSTEM

(75) Inventors: Jeong Je-Chang; Mun Hen-Hee, both of Seoul (KR)

(73) Assignee: Samsung Electronics Co., Ltd., Kyonggi-do (KR)

(*) Notice: Subject to any disclaimer, the term of this patent is extended or adjusted under 35 U.S.C. 154(b) by 0 days.

(21) Appl. No.: 08/024,305

(22) Filed: Mar. 1, 1993

(30) Foreign Application Priority Data

Feb. 29, 1992 (KR) .................................................. 92-3398

(51) Int. Cl.[7] .................................................. H04N 7/12
(52) U.S. Cl. .................................. 375/240.23; 375/240.12
(58) Field of Search .................................. 358/136, 133, 358/135; 348/404, 408, 384, 390, 409–410, 412–413, 415, 416, 409.1, 415.1, 416.1; 375/240.12, 240.23, 246; 382/245, 246, 238; H04N 7/30, 7/32

(56) References Cited

U.S. PATENT DOCUMENTS

| | | | |
|---|---|---|---|
| 4,144,547 | * 3/1979 | Stoffel | 358/133 |
| 4,754,336 | * 6/1988 | Nishizawa | 358/133 |
| 4,821,119 | * 4/1989 | Gharavi | 348/402 |
| 4,985,766 | * 1/1991 | Morrison et al. | 358/136 |
| 5,045,938 | * 9/1991 | Sugiyama | 358/133 |
| 5,057,917 | * 10/1991 | Shalkauser et al. | 358/135 |
| 5,073,820 | * 12/1991 | Nakagawa et al. | 358/133 |
| 5,107,345 | * 4/1992 | Lee | 358/136 |
| 5,136,371 | * 8/1992 | Savatier et al. | 358/135 |
| 5,227,878 | * 7/1993 | Puri et al. | 348/416 |

* cited by examiner

*Primary Examiner*—Vu Le
(74) *Attorney, Agent, or Firm*—Sughrue, Mion, Zinn, Macpeak & Seas, PLLC

(57) ABSTRACT

A multi-scanner circuit includes a circuit for scanning a signal using several different patterns and scanning pattern selector circuit for determining which of the scanning patterns produces the most efficient coding result. The selector circuit then outputs a coded signal, which signal represents the most efficiently coded signal, and a selection identification signal, which identifies the scanning pattern found to be most efficient. In an exemplary case wherein runlength coding is to be used, the selector selects the most efficient scanning pattern for runlength coding.

15 Claims, 3 Drawing Sheets

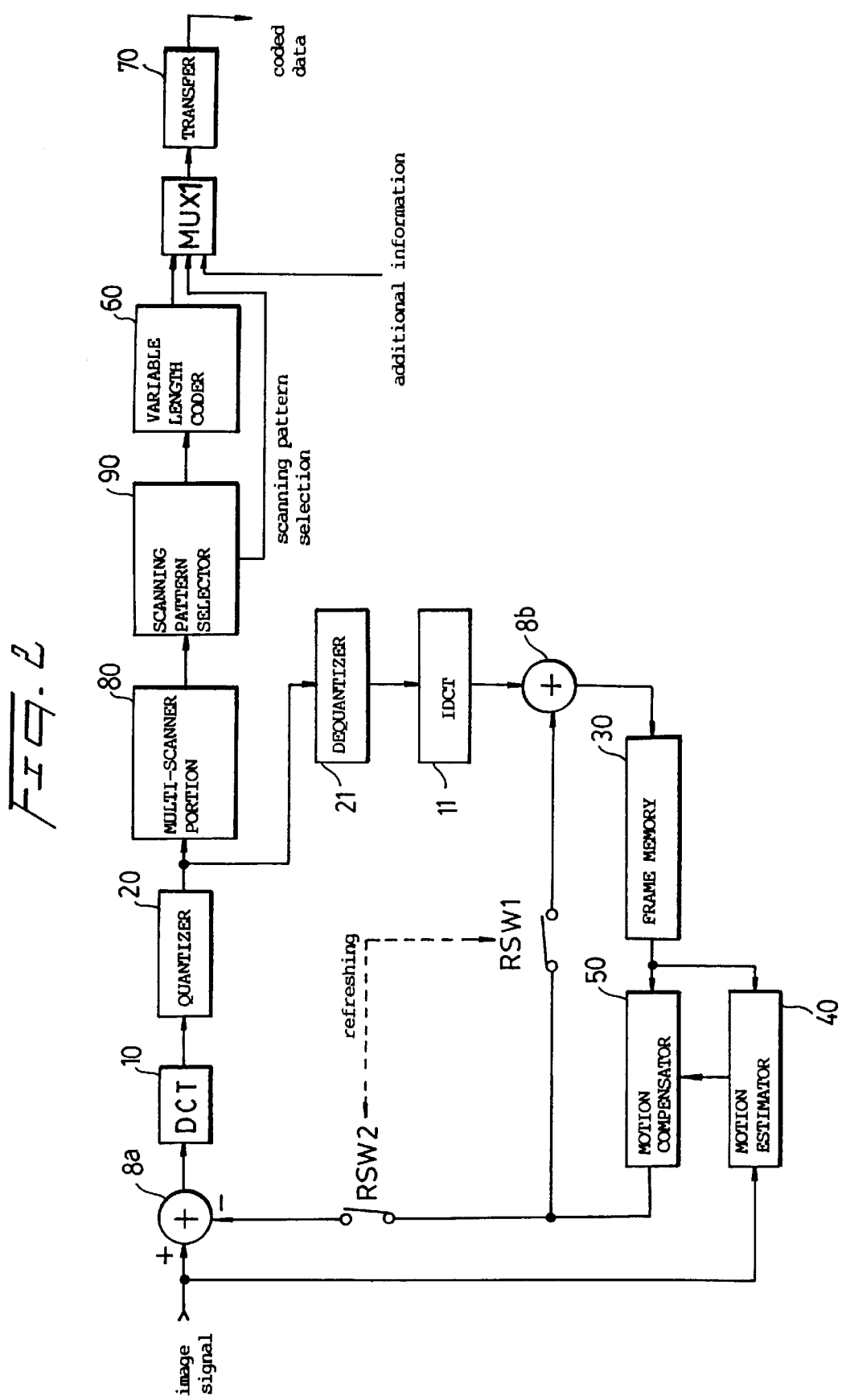

SIGNAL COMPRESSING SYSTEM

FIELD OF THE INVENTION

The present invention relates to a signal compressing system. A system according to the present invention is particularly suited for compressing image signals. The present disclosure is based on the disclosure in Korean Patent Application No. 92-3398 filed Feb. 29, 1992, which disclosure is incorporated herein by reference.

BACKGROUND OF THE INVENTION

Image signals may be compressed by motion-compensated interframe discrete cosine transform (DCT) coding such as is defined by a MPEG (Moving Picture Expert Group) international standard. This form of signal compression has attracted much attention in the field of high definition television (HDTV).

FIG. 1 is a block diagram of such a conventional motion-compensated interframe DCT coder. In the shown coder, an image signal is divided into a plurality of sub-blocks. The sub-blocks are all of the same size, for example 8×8, 16×16, . . . . A motion estimator 40 produces a motion vector, defined by the difference between the current image signal and a one-frame delayed image signal, output by a frame memory 30. The motion vector is supplied to a motion compensator 50 which compensates the delayed image signal from the frame memory 30 on the basis of the motion vector. A first adder 8a serves to produce the difference between the present frame and the delayed, motion compensated frame. A discrete cosine transform portion 10 processes the difference signal, output by the first adder 8a, for a sub-block. The motion estimator 40 determines the motion vector by using a block matching algorithm.

The discrete cosine transformed signal is quantized by a quantizer 20. The image signal is scanned in a zig-zag manner to produce a runlength coded version thereof. The runlength coded signal comprises a plurality of strings which include a series of "0"s, representing the run length, and an amplitude value of any value except "0".

The runlength coded signal is dequantized by a dequantizer 21, inversely zig-zag scanned and inversely discrete cosine transformed by an inverse discrete cosine transforming portion 11. The transformed image signal is added to the motion-compensated estimate error signal by a second adder 8b. As a result the image signal is decoded into a signal corresponding to the original image signal.

Refresh switches RSW1, RSW2 are arranged between the adders 8a, 8b and the motion compensator 50 so as to provide the original image signal free from externally induced errors.

The runlength coded signal is also supplied to a variable length coder 80 which applies a variable length coding to the runlength coded image signal. The variable length coded signal is then output through a FIFO transfer buffer 70 as a coded image signal.

In motion-compensated adaptive DCT coding, the interframe signal can be easily estimated or coded by way of motion compensation, thereby obtaining a high coding efficiency, since the image signal has a relatively high correlation along the time axis. That is, according to the afore-mentioned method, the coding efficiency is high because most of the energy of a discrete cosine transformed signal is compressed at the lower end of its spectrum, resulting in long runs of "0"s in the runlength coded signal.

However, the scanning regime of the aforementioned method does not take account differences in the spectrum e.g., data distribution of motion-compensated interframe DCT signal with time.

A method is known wherein one of a plurality of reference modes is previously selected on the basis of the difference between the present block and that of a previous frame and the image signal is scanned by way of a scanning pattern under the selected mode and suitably quantized. With such a method, however, three modes are employed to compute the energies of the intermediate and high frequency components of the image signal in accordance with the interframe or the intraframe modes in order to determine the appropriate mode. This mode determining procedure is undesirable complicated.

SUMMARY OF THE INVENTION

According to the present invention, there is provided a signal compressing system, comprising coding means for scanning an input signal according to a plurality of different scanning patterns to provided coded versions thereof and selection means for selecting a scanning pattern which produces efficient coding according to a predetermined criterion and outputting a scanning pattern signal identifying the selected scanning pattern.

Preferably, the input signal is an inherently two-dimensional signal, for example, an image signal.

Preferably, the coding means codes the input signal according to a runlength coding regime.

Preferably, the system includes a variable length coder to variably length code the coded signal, produced by scanning according to the selected scanning pattern.

Preferably, the system includes discrete cosine transformer means to produce said input signal. The transformer means may be a motion-compensated interframe adaptive discrete cosine transformer.

BRIEF DESCRIPTION OF THE DRAWINGS

An embodiment of the present invention will now be described, by way of example, with reference to FIGS. 2 and 3 of the accompanying drawings, in which:

FIG. 2 is a block diagram of a coding system embodying the present invention.

DETAILED DESCRIPTION OF THE PREFERRED EMBODIMENTS

Figure 1:
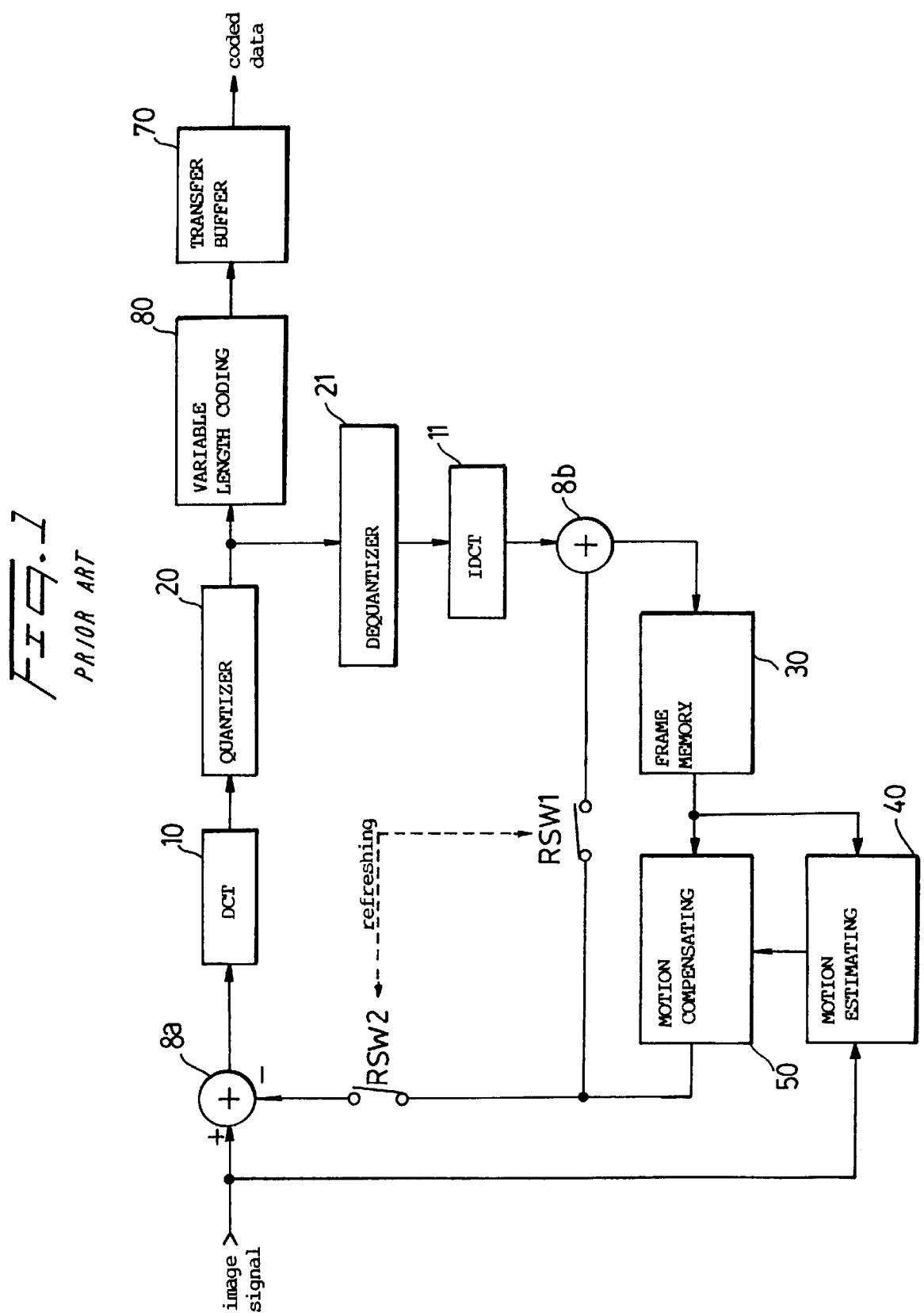
FIG. 1 is a block diagram of a conventional adaptive interframe DCT coding system employing a motion compensating technique.

Referring to FIG. 2, an input signal is divided into equal-sized sub-blocks, for example, 8×8, 16×16, . . . . A motion estimator 40 determines a motion vector by comparing the current frame and a one frame delayed signal from a frame memory 30.

The motion vector is supplied to a motion compensator 50 which, in turn, compensates the delayed frame signal for movement. A first adder 8a produces a difference signal representing the difference between the present frame and the delayed, motion-compensated frame. A DCT coder 10 DCT-codes the difference signal. The DCT coded image signal is quantized by a quantizer 20 and then dequantized by a dequantizer 21. The dequantized signal is supplied to a second adder 8b, via IDCT 11, which adds it to the output of the motion compensator 11. This produces a signal corresponding to the original image signal.

The output of the motion compensator 50 is applied to the adders 8a, 8b by refresh switches RSW2 and RSW1, respectively.

The quantized image signal is also supplied to a multi-scanner 80 which scans it according to a plurality of predetermined patterns.

A scanner pattern selector 90 selects the scanning pattern which produces the minimum number of bits to represent the current sub-block. The scanning pattern selector 90 also produces selection data which identifies the selected scanning pattern.

The image signal output by the scanning pattern selector 90 is variable length coded by a variable length coder 60. The variable length coder 60 compresses the image signal output by the scanning pattern selector 90. The variable length coder 60 operates such that a large proportion of the data samples are each represented by a small number of bits while a small proportion of the data samples are each represented by a large number of bits.

When a discrete cosine transformed image signal is quantized and runlength coded, the number of "0"s is increased over all, while the number of "0"s decreases as the magnitude of the signal increases. Accordingly, data compression is achieved because "0" can be represented by only a few bits and "255" can be represented by a relatively large number of bits.

Both the variable length coded signal and the selection data are supplied to a multiplexer MUX1 which multiplexes the variable length coded signal and the selection data, and optionally additional information such as teletext.

Since the variable length coded signal has data words of different lengths, a transfer buffer 70 is employed to temporarily store the multiplexed signal and output it at a constant rate.

The original image signal is reconstructed at a remote station by performing the appropriate inverse scanning of the runlength coded signal in accordance with the multiplexed scanning pattern selection data.

Figure 3A:
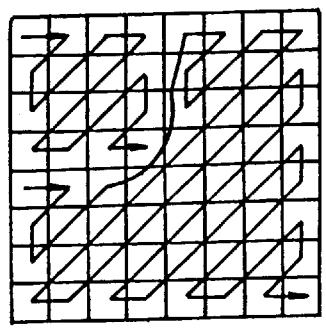
FIGS. 3(A) 3(H) show various possible scanning patterns according to the present invention.
Figure 3B:
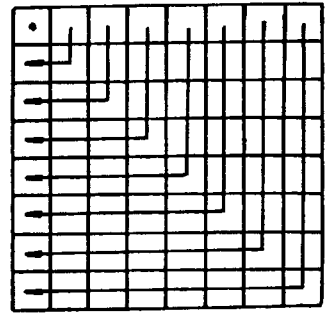
Figure 3C:
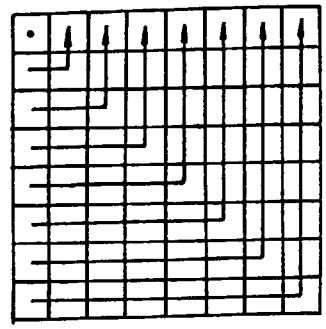
Figure 3D:
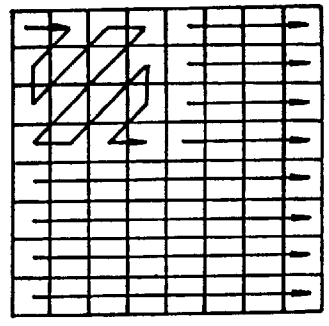
Figure 3E:
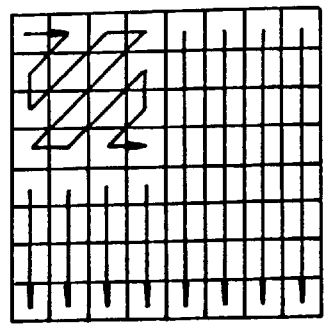
Figure 3F:
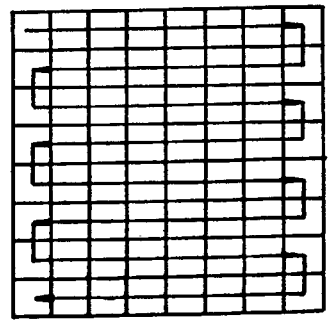
Figure 3G:
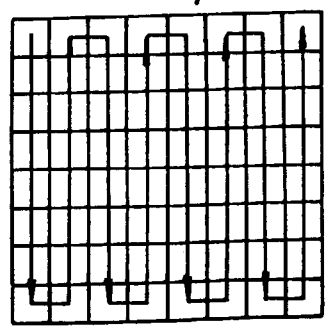
Figure 3H:
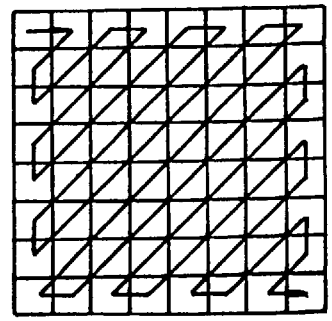

FIGS. 3A to 3H show possible scanning patterns employed by the multi-scanner 80. Additional scanning patterns will be apparent to those skilled in the art. However, if the number of patterns becomes too large, the coding efficiency is degraded as the selection data word begins to take longer.

As described above, according to the present invention, the quantized image signal is scanned according to various scanning patterns, and then the most efficient pattern is selected. A suitable measure of efficiency is the number of bits required to runlength code the image signal.

What is claimed is:

1. A signal compressing system, comprising:
    coding means for simultaneously scanning a first signal according to a plurality of different scanning patterns to provide respective coded versions thereof;
    selection means for selecting one of said scanning patterns which produces efficient sub-block coding according to a predetermined criterion and for outputting a scanning pattern signal identifying the selected scanning pattern and the selected coded version of said first signal; and
    a variable length coder to variable length code the received selected coded version of said first signal which is produced by scanning according to the selected scanning pattern.

2. A system according to claim 1, wherein the coding means codes the first signal according to a runlength coding regime.

3. A system according to claim 2, further comprising discrete cosine transformer means to produce said first signal.

4. A system according to claim 2, further comprising a discrete cosine transformer generating said first signal.

5. A system according to claim 1, further comprising discrete cosine transformer means for producing said first signal.

6. A system according to claim 5, wherein said transformer means is a motion-compensated interframe adaptive discrete cosine transformer.

7. An image data compressing system comprising:
    means for obtaining a difference between the present frame and a preceding motion-compensated frame of an image signal;
    means for coding the difference by discrete cosine transform coding and quantizing the discrete cosine transform coded image signal difference and inverse discrete cosine transform coding the quantized image signal;
    means for compensating motion of the image signal;
    means for coding the quantized image signal by variable length coding;
    a selector for selecting an appropriate image scanning pattern from at least one of a plurality of image scanning patterns;
    a multi-scanner for simultaneously scanning the quantized image signal by various said scanning patterns;
    a scanning mode selector for selecting a scanning mode in which a number of bits produced from a start to an end of a data sub-block is minimized, wherein said means for coding the image signal output of the scanning mode selector by way of variable length coding; and
    a multiplexer for multiplexing the variable length coded signal and the scanning pattern selecting signal output by the scanning pattern selector and for outputting the multiplexed signal.

8. A signal compressing system for coupling a first signal representing a video signal to a first coder as a selected coded signal, said system comprising:
    a second coder for simultaneously scanning said first signal according to a plurality of different scanning patterns and producing respective coded signals; and
    a selector receiving said coded signal for selecting one of said scanning patterns based upon a predetermined sub-block selection criterion and for outputting a scanning pattern signal identifying the selected scanning pattern and said selected coded signal.

9. A system according to claim 8, wherein said second coder codes said first signal according to a runlength coding regime.

10. The system according to claim 9, wherein said first coder comprising a variable length coder to variable length code said selected coded signal.

11. The system according to claim 9, further a comprising discrete cosine transformer for generating said first signal.

12. The system according to claim 8, wherein said first coder comprising a variable length coder to variable length code the received selected coded signal.

13. The system according to claim 12, further comprising a discrete cosine transformer producing said first signal.

14. The system according to claim 13, wherein said transformer comprises a motion-compensated interframe adaptive discrete cosine transformer.

15. The system according to claim 8, further comprising a discrete cosine transformer producing said first signal.

\* \* \* \* \*